United States Patent [19]

Auman et al.

[11] Patent Number: 5,731,404
[45] Date of Patent: Mar. 24, 1998

[54] POLYIMIDE FILM FROM PYROMELLITIC DIANHYDRIDE AND A BIS(4-AMINOPHENOXY) AROMATIC COMPOUND AS AN ALIGNMENT LAYER FOR LIQUID CRYSTAL DISPLAYS

[75] Inventors: Brian Carl Auman, Newark, Del.; Edgar Bohm, Griesheim, Germany

[73] Assignees: E. I. du Pont de Nemours and Company, Wilmington, Del.; Merck Patent GmbH, Darmstadt, Germany

[21] Appl. No.: 551,664

[22] Filed: Nov. 1, 1995

[51] Int. Cl.$^6$ ............ C08G 73/10; C09K 19/00; B32B 27/34
[52] U.S. Cl. ............ 528/353; 528/125; 528/128; 528/172; 528/173; 528/176; 528/183; 528/185; 528/188; 528/220; 528/229; 528/350; 428/1; 428/473.5
[58] Field of Search ............ 528/353, 183, 528/185, 188, 220, 229, 125, 128, 172, 173, 176, 350; 428/473.5, 1

[56] References Cited

U.S. PATENT DOCUMENTS

| | | | |
|---|---|---|---|
| 4,847,311 | 7/1989 | Yamaya et al. | 528/185 |
| 5,288,843 | 2/1994 | Tamai et al. | 528/353 |
| 5,459,233 | 10/1995 | Tamai et al. | 528/353 |

FOREIGN PATENT DOCUMENTS

| | | | |
|---|---|---|---|
| 0 387 059 A3 | 9/1990 | European Pat. Off. | |
| 2-309322 | 12/1990 | Japan | G02F 1/1337 |
| 2-309323 | 12/1990 | Japan | G02F 1/1337 |
| WO 92/12219 | 7/1992 | WIPO | |

*Primary Examiner*—P. Hampton-Hightower

[57] ABSTRACT

A polyimide alignment film based on pyromellitic dianhydride and a bis(4-aminophenoxy) aromatic compound, such as 1,3-bis(4-aminophenoxy)benzene or 1,4-bis(4-aminophenoxy)benzene, providing low tilt angles of from to 2 degrees when used in liquid crystal displays.

10 Claims, No Drawings

POLYIMIDE FILM FROM PYROMELLITIC DIANHYDRIDE AND A BIS(4-AMINOPHENOXY) AROMATIC COMPOUND AS AN ALIGNMENT LAYER FOR LIQUID CRYSTAL DISPLAYS

BACKGROUND OF THE INVENTION

1. Field of the Invention

The present invention relates to a polyimide alignment film based on pyromellitic dianhydride and a bis(4-aminophenoxy)aromatic compound and to a liquid crystal display device using such an alignment film.

2. Description of the Prior Art

Liquid crystal display (LCD) devices have become increasingly important in displays which require very low consumption of electrical power or where the environment dictates a lightweight, planar, flat surface. Thus, LCD's are used in display devices such as wristwatches, pocket and personal computers, aircraft cockpit displays, etc.

In its simplest form, a liquid crystal display device consists of a liquid crystal layer with opposite sides, a set of electrodes on either side of the liquid crystal layer and an alignment polymer layer between each set of electrodes and the liquid crystal layer. Alignment of the liquid crystal molecules occurs at a certain angle, referred to as the tilt angle, with respect to the plane of the inside of two substrates, e.g. glass plates, plastic sheets, quartz plates or others, which support the electrodes. The inside of the substrates have coatings of sets of transparent electrodes (electrical conductors), usually indium-tin oxide (ITO). The sets of electrodes are patterned, e.g. by etching, compatible with the information to be displayed by the LCD. The alignment process is most easily carried out by solution casting (spin coating, roller coating, dipping, spraying, printing and/or doctor blading) an organic polymer onto the two ITO coated substrates. After removal of the solvents and/or curing of the polymer layers, the substrates are usually rubbed or buffed in one direction with cloths. The rubbing process serves to establish a unique optical direction. After rubbing both substrates, they are rotated from 70 to 360 degrees with respect to each other; adhered together using organic adhesives to preserve a constant thickness to a space or gap between the substrates; filled with various mixtures of liquid crystal materials; and finally sealed using organic adhesives. At this stage, polarizing films are often attached to the outside surfaces of the substrates by a lamination process. Finally, electrical connections are made to both substrates in a manner consistent with the electrical and display designs.

The use of rubbed polymer films, i.e. alignment direction and tilt angle controlling films, dominates the process technology used in the production of all categories of liquid crystal displays, and polyimides are the most common alignment films in use today. Moreover, the tilt angle and its magnitude are very important in the various electro-optic responses and the electro-optic properties of the LCD device. The stability, legibility and reliability of the LCD are all related to the magnitude and stability of the tilt angle. The tilt angle has to be stable to high temperature and illumination, and the magnitude of the tilt angle has to be stable for long storage times in order to provide a long operational time for the displays. This holds particularly for the value of the tilt angle obtained after the heat treatment of the display after sealing the cells filled with liquid crystals.

Polyimide films used to control the alignment direction and the tilt angle of liquid crystal molecules in liquid crystal displays are very thin, generally being on the order of from 100 to 2000 angstroms. The alignment is induced in a unique direction of the polyimide polymer by gentle buffing with specific cloths. The actual tilt angle obtained is a function of polymer ordering on the surface, the resulting surface energy, the nature of the cloth used to buff the surface and the amount of buffing work. In addition to these variables, each of the hundreds of commercial liquid crystal formulations interacts differently with a given surface. In general, however, the single most important factor determining the value range of the tilt angle is the intrinsic character of the polymer used to control this angle.

For most standard TN or STN liquid crystal displays (off=white), conventional polyimides based on pyromellitic dianhydride and 4,4'-diaminodiphenyl ether or 3,3',4,4'-benzophenonetetracarboxylic dianhydride, 4,4'-diaminodiphenyl ether and m-phenylene diamine give tilt angles ranging from 2 to 3 degrees which are adequate for these displays. For more sophisticated STN displays, however, higher tilt angles of greater than 4 degrees are required and polyimides modified with alkyl or fluoroalkyl groups have generally been used. There are, however, other liquid crystal display applications which require lower tilt angles of less than 2 degrees while maintaining good and stable alignment properties. For example, normally black liquid crystal displays (off=black) preferably require tilt angles of around 1.5 degrees which are lower than that achieved using conventional polyimides. Tilt angles of less than 1 degree in TN LC displays cause the occurrence of reverse tilt domains, which leads to the scattering of light, reducing the contrast and disturbing the display performance of "normally black" TN LC displays. "Normally black" TN means that the absorption axes of the polarizers of the LCD are essentially parallel to each other and also parallel to one of the two directional orientations of the LC at one substrate side. In contrast to tilt angles of less than 1 degree, tilt angles significantly greater than 2 degrees cause reduced contrast, i.e. an appreciable "off state" transmission due to the reduction of the effective birefringence and cause an increased viewing angle dependence of the contrast. Thus, neither tilt angles of less than 1 degree nor of more than 2 degrees are desirable. Generally, non-fluorinated aromatic polyimides provide surface tilt angles in the range of 2 to 3 degrees.

The frame sealant used in the LCD is typically an organic adhesive which is sealable by exposure to UV radiation or to elevated temperature. Commonly used temperature curable organic adhesives are set at a typical peak temperature of 150° to 200° C. for a curing time ranging from several minutes to several hours.

The alignment of the liquid crystals, which is induced by the rubbing of the alignment layer, has to withstand this temperature treatment, as the sealant has to be cured after rubbing of the surface before filling the cell with the liquid crystal and annealing the LCD. The requirement of stability against heat treatment is most severe for orientation layers which are cured in the same range of temperatures used to set the frame sealant.

Therefore, a need exists for a polyimide alignment film which provides tilt angles in the range of from 1 to 2 degrees, preferably from 1.2 to 1.8 degrees, and most preferably from 1.4 to 1.6 degrees, and also gives good and stable alignment of liquid crystal molecules. These tilt angles have to be stable under the elevated temperatures or illumination (e.g. UV radiation) necessary to cure the sealant materials. They also should be stable to long time storage at elevated temperatures. The tilt angles also have to be stable to changes in parameters of the production process such as curing temperatures and rubbing strength. Also the variation of the tilt angle with the type of liquid crystal mixture used has to be small.

Japanese patent applications 2-309322 and 2-309323, published on Dec. 25, 1990, disclose polyimide alignment films, which reduce image blurring when used in a nematic liquid crystal display element. The polyimide films are derived from a tetracarboxylic dianhydride component such as pyromellitic dianhydride, and an aromatic diamine component containing structural units of the formula

wherein m is 0 to 2 used in combination with either (1) a phenylene, biphenylene or terphenylene diamine or (2) a diaminodiphenylsulfone. There is no disclosure, however, of the specific polyimide alignment films of the present invention, which are derived from pyromellitic dianhydride and 1,4-bis or 1,3-bis-(4-aminophenoxy)-benzene, 4,4'-bis (4-aminophenoxy)biphenyl or 4,4'-bis(4-aminophenoxy) diphenylsulfone and which provide tilt angles of from 1 to 2 degrees and give good liquid crystal alignment.

SUMMARY OF THE INVENTION

The present invention provides a polyimide alignment film for aligning a liquid crystal layer of a liquid crystal display device comprising pyromellitic dianhydride as the aromatic tetracarboxylic dianhydride component and an aromatic diamine component of the formula

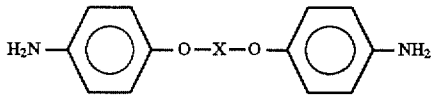

wherein X is selected from the group consisting of

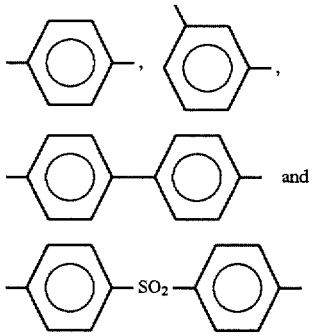

and wherein said polyimide alignment film provides said liquid crystal layer with a tilt angle of from 1 to 2 degrees, preferably from 1.2 to 1.8 degrees and most preferably from 1.4 to 1.6 degrees. These tilt angles are stable under the elevated temperatures or illumination (e.g. UV radiation) necessary to cure the sealant materials. They are also stable to long time storage at elevated temperatures. The tilt angles are also stable to changes in process parameters such as the curing temperatures and rubbing strength and exhibit no pronounced dependence on the liquid crystal material used.

The tilt angles are stable at the elevated temperatures or under exposure to UV radiation which are commonly used to cure the frame sealants used in LCDs. This holds even for the polyimide alignment films according to the present invention where the sealants are cured at low curing temperatures, e.g. of 180° C. or below.

The present invention further provides a liquid crystal display device comprising:

(a) a liquid crystal layer having opposite sides;

(b) a set of electrodes on either side of said liquid crystal layer; and (c) a polyimide alignment film layer, between each set of electrodes and said liquid crystal layer, comprising pyromellitic dianhydride as the aromatic tetracarboxylic dianhydride component and an aromatic diamine component of the formula

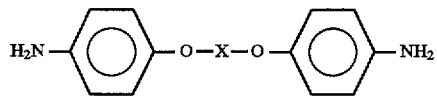

wherein X is selected from the group consisting of

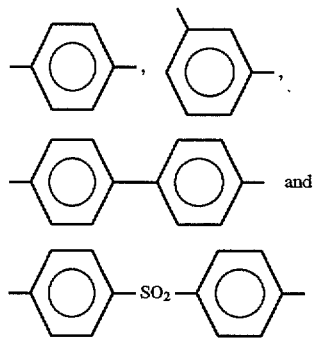

and wherein said polyimide alignment film provides said liquid crystal layer with a tilt angle of from 1 to 2 degrees, preferably from 1.2 to 1.8 degrees and most preferably from 1.4 to 1.6 degrees.

The tilt angles are stable under the elevated temperatures or UV radiation exposure conditions used to cure the frame sealants used to fabricate the LCD. The tilt angles are stable after exposure to a temperature of at least 2 hours at 180° C.. This heat treatment, sometimes also called post heat treatment, is also a good initial test for the lifetime of the alignment of an LCD. The tilt angles of the LCDs according to the present invention are stable after storage for 250 hours at 60° C.. Preferably, the tilt angles are stable after storage for 500 hours and, more preferably, for storage for at least 1000 hours at 70° C.. Most preferably, they are stable for 1000 hours storage at 80° C. or more, with the storage temperature depending on the application. For outdoor and automotive use, the storage time is 500 hours and, preferably, 1000 hours at a temperature of at least 100° C..

DETAILED DESCRIPTION OF THE INVENTION

The polyimide used as an alignment film in the liquid crystal display device of the present invention is a polycondensation-imidization reaction product of an aromatic tetracarboxylic dianhydride component with an aromatic diamine component.

The aromatic tetracarboxylic dianhydride component comprises pyromellitic dianhydride as the major dianhydride ingredient. The aromatic tetracarboxylic dianhydride component may contain, in addition to pyromellitic dianhydride, up to 40 mole %, preferably up to 20 mole %, of an additional tetracarboxylic dianhydride.

Tetracarboxylic dianhydrides which can be used in combination with the pyromellitic dianhydride include, but are not limited to, 3,3',4,4'-biphenyltetracarboxylic dianhydride, 3,3',4,4'-benzophenonetetracarboxylic dianhydride and oxydiphthalic dianhydride. These tetracarboxylic dianhydrides may be used alone or in combination. Fluorinated dianhydrides such as 2,2-bis(3,4-dicarboxyphenyl)-hexafluoropropanedianhydride, 9,9-bis(trifluoromethyl)-2,3,6,7-xanthenetetracarboxylic dianhydride, 9-phenyl-9-trifluoromethyl-2,3,6,7-xanthenetetracarboxylic dianhydride, cyclobutanetetracarboxylic dianhydride, 2,3,5-tricarboxycyclopentyl acetic acid dianhydride, and the like, may also be used but in amounts of less than 20 mole % due to the tendency of the fluorinated polyimides to give higher tilt angles.

When the tetracarboxylic dianhydride component contains less than 60 mole % of pyromellitic dianhydride, the tilt angle provided by the polyimide may be too high for use in normally black TN liquid crystal displays. The stability of the tilt angle may also be adversely affected.

The aromatic diamine component comprises, as the major ingredient, an aromatic diamine having the formula

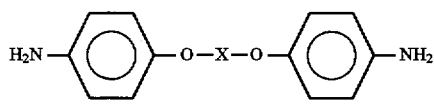

wherein X is a divalent radical selected from the group consisting of

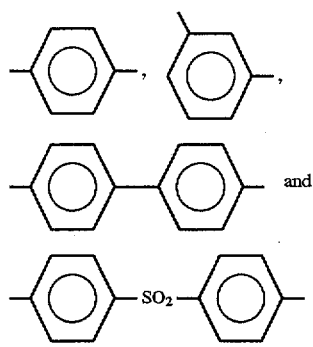

and

The aromatic diamine component may contain, in addition to the major aromatic diamine, an additional aromatic diamine comprising not more than 50 mole %, preferably not more than 20 mole %, of other aromatic diamines. When the proportion of the major aromatic diamine is less than 50 mole %, the alignment and/or stability of the tilt angle may be adversely affected. In addition, the tilt angle may be lower or higher than the desired range of 1 to 2 degrees.

Aromatic diamines which can be used in combination with the major aromatic diamine include, but are not limited to, 4,4-diaminodiphenyl ether, m-phenylene diamine, p-phenylene diamine, and the like, and fluorinated diamines such as 2,2-bis(4-aminophenyl)hexafluoropropane, 2,2'-bis(trifluoromethoxy)benzidine, 2,2'-bis(trifluoromethyl)benzidine, 2,2-bis[4-(3-aminophenoxy)phenyl]-hexafluoropropane and the like. The amount of fluorinated diamine, if present, should be limited because of the tendency to give high tilt angles.

Cycloaliphatic diamines, such as bis-(p-aminocyclohexyl)methane (PACM) or 1,4-cyclohexanediamine, and aliphatic diamines, such as hexamethylenediamine, may also be used as diamine comonomers, but are less preferred according to the present invention.

The polyimide alignment film of the present invention may be prepared by solution polymerization of substantially equimolar amounts of the aromatic tetracarboxylic acid component and the aromatic diamine component at ambient room temperature to 50° C. in N-methylpyrrolidone or N,N-dimethylacetamide solvent.

A suitable end-capping agent such as phthalic anhydride or aniline may also be added in order to aid in molecular weight control but is not required according to the present invention.

The resulting poly(amic acid) solution is subsequently diluted and coated by spin coating onto indium-tin oxide (ITO) coated glass plates and then cured at a temperature of from 150° to 350° C. for from 1 minute to 2 hours, preferably from 180° to 250° C. for from 30 minutes to 2 hours, to effect dehydration and ring closure of the poly (amic acid) to form a polyimide coating. The polyimide coating is further subjected to a rubbing treatment, which is well-known in the art, to provide an alignment controlling film of the invention. The thickness of the alignment film typically ranges from 100 to 2000 angstroms and can be adjusted by varying the amount of polymer applied or the coating method used.

A review of conventional alignment controlling techniques is given, for example, by I. Sage in Thermotropic Liquid Crystals, edited by G. W. Gray, John Wiley & Sons, 1987, pages 75 to 77 and by J. M. Geary et al, in Journal of Applied Physics, Vol. 62(10), 1987, pages 4100–4108.

A pair of the glass substrates covered with the electrodes and coated with the alignment controlling film are placed in opposition to each other, so that the respective alignment films face each other, and then are bonded to each other to form a predetermined space by interposing spacers between them or by some other means. An STN liquid crystal composition, for example, ZLI-2293, (sold by Merck KGaA, Darmstadt, Germany) is filled into said space and then the filling hole is sealed with an adhesive.

Light polarizer layers are deposited on both outside glass surfaces. The directions of polarization of the two polarizers are adjusted with respect to each other, depending on the specific cell configuration. The polarizer orientations are described, for example, in European Patent 01 31 216 and European Patent 02 60 450, while other orientations can also be used. In compensated TN cells, the two directions are either substantially perpendicular (normally white cells) or substantially parallel (normally black cells) to each other. The liquid crystals assume a spiral orientation through the thickness of the layer following the alignment of the liquid crystals by the two alignment layers which have directions from substantially 70° to 360° to each other. Twist angles, from 70° to 110° are particularly preferred for TN displays. Especially preferred according to the present invention are "normally black" TN displays with twist angles from 70 to 110 degrees and preferably from 80 to 100 degrees. For STN displays, twist angles from 170° to 270° are preferred, and twist angles from 180° to 220° are particularly preferred. Twist angles higher than 90° can be realized by adding a suitable doping component to the liquid crystal mixture.

A particularly preferred liquid crystal alignment film of the present invention comprises a polyimide film derived from pyromellitic dianhydride and 1,3-bis(4-aminophenoxy)benzene, which provides an initial tilt angle of 1.7, which remains stable, exhibiting only an 18% decrease in tilt angle to 1.4, after post heat treatment (180° C., 2 hours).

Liquid crystals that can be used in the present invention are either nematic or smectic liquid crystals. Nematic liquid crystals are preferred. These can have positive dielectric anisotropies as well as negative dielectric anisotropies.

For TN and STN applications nematic liquid crystals with positive dielectric anisotropy are preferred. Dielectric negative liquid crystals are used for ECB displays and for some displays using an electric field essentially parallel to the substrates, e.g. by comb-shaped electrodes leading to in-plane switching of the liquid crystals. For these in-plane switching displays, as well as for amorphous TN and also for axially symmetric micro domain displays, dielectrically positive liquid crystals can be used.

Typically the liquid crystals are mixtures of from 3 to about 30 compounds. In some cases even up to 40 and more compounds can be used. Preferred are mixtures consisting of from 5 to 25 compounds, whereas especially preferred are mixtures of from 7 to 20 compounds. Most preferred, however, are mixtures containing from 8 to 16 compounds.

The liquid crystals used in the present invention have a clearing point of more than 60° C., preferably more than 70° C. and, most preferably, more than 80° C.. For STN applications clearing points of at least 85° C. and of even more than 90° C. are preferred. The phase range is at least 80° C. wide, however, more than 90° C. is preferred. In many applications this range is more than 100° C.. The lower storage temperature is at least –20° C., preferably –30° C., and most preferably –40° C.

Liquid crystal mixtures that can be used in the TN liquid crystal displays of the present invention are based on cyano substituted materials. They preferably contain compounds with terminal cyano substitution which can also bear one or more fluoro substituents, preferably in ortho position to the cyano group. These mixtures preferably further contain superfluorinated materials (SFM's). In another embodiment of the present invention, the liquid crystal mixtures are based on these superfluorinated materials.

Liquid crystals for STN displays which are especially preferred according to the present invention, preferably contain cyano phenylcyclohexanes. These mixtures preferably additionally or alternatively contain compounds with —CH=CH— groups in the alkyl side chains (i.e. alkenyl compounds) or with —CH=CH— bridging groups between the ring systems. Liquid crystals mixtures containing heterocyclic rings are further preferred.

The liquid crystal mixtures used in the LCD's according to the present invention preferably contain at least one compound of formula (I).

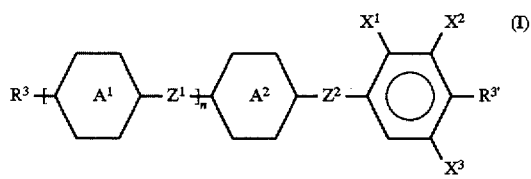

wherein
$R^3$ is an alkyl group containing from 1 to 12 carbon atoms wherein, in addition, one or two non-adjacent —$CH_2$— groups can be replaced by —O—, —CO—, —COO—, —OCO— or —CH=CH—;

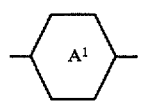

and

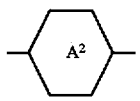

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

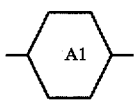

and

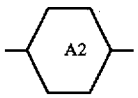

is alternatively pyrimidine-2,5-diyl, pyridine-2,5-diyl or trans-1,4-dioxane-2,5-diyl;

$Z_1$ and $Z_2$, independently of one another, are a direct bond, —$CH_2CH_2$—, —COO—, —OCO—, —CH=CH— or —C≡C—;

$X^1$, $X^2$ and $X^3$, independently of one another, are H or F;
$R^{3'}$ is the same as $R^3$ or is Q-Y;
Q is —$CF_2$—, —$OCF_2$—, —$C_2F_4$— or a direct bond;
Y is H, F, Cl or CN; and
n is 0, 1 or 2.

The proportion of one or more compounds of the formula (I) in the liquid crystal mixtures used according to the invention is preferably more than 15% by weight and, more particularly, more than 20% by weight. Liquid crystal mixtures containing more than 40% by weight and particularly more than 50% by weight of one or more compounds of the formula (I) are particularly preferred.

In a preferred embodiment of the present invention the liquid crystal mixture contains at least one compound of formula (I) where $R^{3'}$ is CN, $X^1$ is H and at least one of $X^2$ and $X^3$ is F. Especially preferred are liquid crystal mixtures containing at least one of the compounds of formulas (Ia) to (Ih)

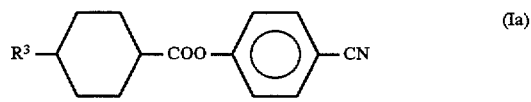
(Ia)

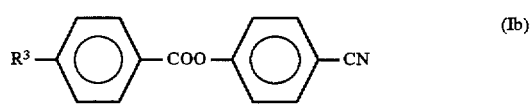
(Ib)

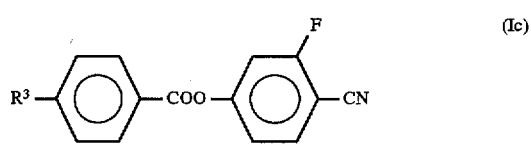
(Ic)

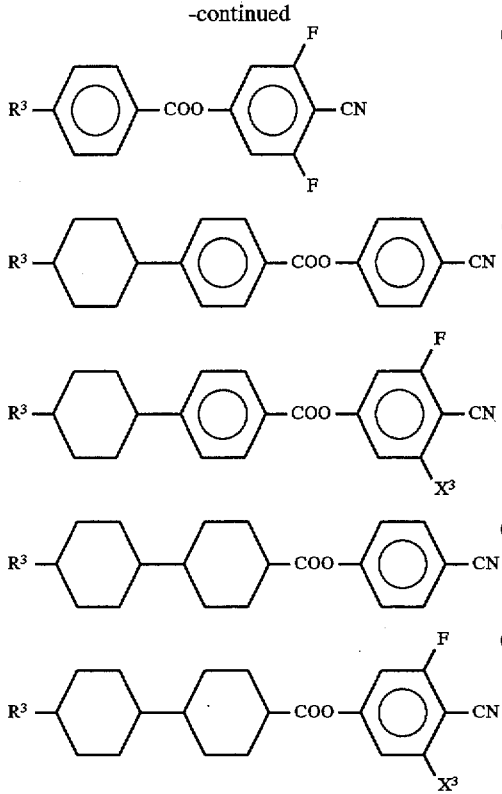

wherein $R^3$ and $X^3$ have the same meaning as in formula (I) and $X^3$ is preferably H.

The proportion of compounds of the formulas (Ia) to (Ih) is preferably from 2 to 50%, more particularly, from 4 to 40% and, most preferably, from 7 to 30%. In a further preferred embodiment, the liquid crystal mixture contains at least 5% of at least one compound of the formulas (Ii) to (Il)

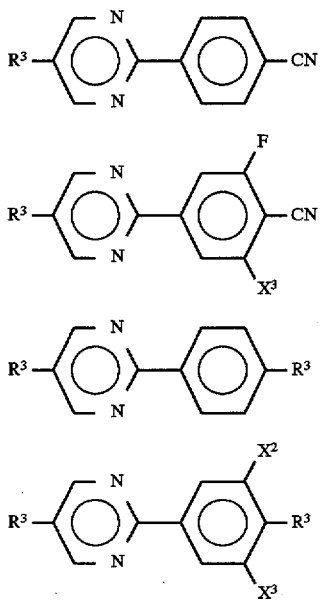

wherein $R^3$, $X^2$ and $X^3$ have, independently from each other, the same meaning as in formula (I) and $X^3$ is preferably H.

The liquid crystal mixtures used according to the invention can contain further components which are preferably selected from nematic or nematogenic (monotropic or isotropic) substances, in particular substances selected from the group consisting of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexylphenyl cyclohexanecarboxylate, cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl) benzenes, bis ( cyclohexyl ) biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electro-optical systems according to the invention may also contain one or more dielectrically neutral compounds having formulas (II) to (III).

 (II)

 (III)

In the formulas (II) and (III) above, L and E may be identical or different and are each, independently of one another, a divalent radical selected from the group consisting of -Phe-, -Cyc-, -Phe-Phe-, -Phe-Cyc-, -Cyc-Cyc-, -Pyr-, -Dio-, -G-Phe- and -G-Cyc- and mirror images thereof. Phe is unsubstituted or fluorine substituted 1,4-phenylene. Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans(-1,4-cyclohexyl)ethyl, pyrimidine-2,5-diyl, pyridine-2,5-diyl or 1,3-dioxane-2,5-diyl. One of the radicals L and E is preferably Cyc, Phe or Pyr. E is preferably Cyc, Phe or Phe-Cyc.

The liquid cyrstals used in the invention preferably contain one or more components selected from compounds of formulas (II) and (III), wherein L and E are selected from the group consisting of Cyc, Phe and Pyr and simultaneously one or more components are selected from the compounds of formulas (II) and (III), wherein one of the radicals L and E is selected from the group comprising Cyc, Phe and Pyr and the other radical is selected from the group consisting of -Phe-Phe-, -Phe-Cyc-, -Cyc-Cyc-, -G-Phe- and -G-Cyc-, and, if desired, one or more components are selected from the compounds of formulas (II) and (III), wherein the radicals L and E are selected from the group consisting of -Phe-Cyc-, -Cyc-Cyc-, -G-Phe- and -G-Cyc-.

$R^4$ and $R^5$ in the compounds of formulas (II) and (III) are each, independently of one another, preferably alkyl, alkenyl, alkoxy, aklenyloxy or alkanoyloxy having up to 8 carbon atoms. In most of these compounds, $R^4$ and $R^5$ are different from one another, one of $R^4$ and $R^5$ being in particular alkyl, alkoxy or alkenyl.

Especially preferred is the following group of dielectrically neutral compounds of formulas (IV) and (V).

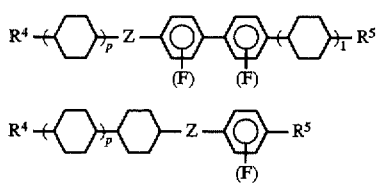

wherein $R^4$ and $R^5$ are the same as described for formulas (II) and (III),

Z is a direct bond or —$CH_2CH_2$—, l and p, independently from each other, are 0 or 1, and

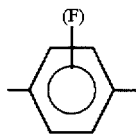

is 1,4-phenylene, 2-fluoro-1,4-phenylene, 3-fluoro-1,4-phenylene or 2,3-difluoro-1,4-phenylene.

The weight proportion of the compounds of formulas (II) to (V) used in the liquid crystal mixtures according to the invention is preferably from 0 to 50% by weight and, in particular, from 0 to 40% by weight.

Liquid crystal compounds according to formula (I) wherein Y is H, F or Cl are defined as SFM materials while compounds where Y is CN are defined as carbonitrile compounds.

TN liquid crystal displays of the present invention, preferably contain liquid crystal mixtures which are based on cyano substituted compounds such as e.g. alkyl or alkenyl cyano phenylcyclohexanes. Especially preferred are LCD's, wherein the liquid crystal mixture contains at least 10% by weight and, most preferably, not less than 25% by weight of one or more compounds according to formula (I) wherein $R^{3'}$ is CN. The liquid crystal mixture of TN LCD's according to the present invention preferably contains from 5 to 35% of compounds according to formula (I) wherein $R^{3'}$ is CN and $X^3$ is F. In a further preferred embodiment, the liquid crystal mixture additionally contains a dichroic dye which decreases the "off state" transmission of "normally black" TN displays.

LCD's which are either directly time multiplexed or actively multiplex addressed, preferably contain a component of one or more carbonitrile compounds. This is especially true for STN displays which can be driven by a passive or by the so-called active multiplex addressing scheme. The percentage of the carbonitrile component with respect to the weight of the liquid crystal mixture is preferably at least 10% by weight and specifically not less than 25% by weight. Especially preferred are liquid crystal mixtures containing at least 20% by weight of one or more compounds of formula (I) wherein Y is CN. The liquid crystal mixture preferably contains at least 30% by weight of carbonitrile compounds and has a complex composition of at least 6 and especially at least 7 liquid crystalline compounds. In another specifically preferred embodiment, the liquid crystal mixture contains at least 15% by weight of at least one 2-ring and at least one 3-ring carbonitrile compound according to formula (I) with the ratio of the percentages of 3- and 4-ring compounds to 2-ring compounds being at least 0.18.

The liquid-crystal compounds of formula (I) and compounds of formulas (II) to (V) are known, and are prepared by methods known per se, for example, as described in Houben-Weyl, Methoden der Organischen Chemie [Methods of Organic Chemistry], Stuttgart, Germany.

Liquid crystal mixtures used in the present invention are well-known in the prior art. Preferred LC mixtures of the types described above, are commercially available from Merck KGaA, Darmstadt, Germany under the trademark Licristal®.

The present invention is illustrated in more detail by the following examples which, however, do not in any way restrict the scope of the invention.

GLOSSARY

PMDA=pyromellitic dianhydride
6FDA=2,2-bis(3,4-dicarboxyphenyl)hexafluoropropane dianhydride
BTDA=3,3'4,4'-benzophenonetetracarboxylic dianhydride
ODPA=oxydiphthalic dianhydride
BPDA=3,3'4,4'-biphenyltetracarboxylic dianhydride
PA=phthalic anhydride
CBDA=cyclobutanetetracarboxylic dianhydride
PPD=p-phenylenediamine
ODA=4,4'-diaminodiphenyl ether
MPD=m-phenylenediamine
APB-134=1,3-bis(4-aminophenoxy)benzene
APB-133=1,3-bis(3-aminophenoxy)benzene
APB-144=1,4-bis(4-aminophenoxy)benzene
BAPB=1,4-bis(4-aminophenoxy)biphenyl
BAPS=4,4t-bis(4-aminophenoxy)diphenylsulfone
m-BAPS=4,4'-bis(3-aminophenoxy)diphenylsulfone
Bisaniline M=1,3-bis[2-(4-aminophenoxy)isopropyl]benzene
Bisaniline P=1,4-bis[2-(4-aminophenoxy)isopropyl]benzene
BAPP=2,2-bis[4-(4-aminophenoxy)phenyl]propane
3,3'-DADS=3,3'-diaminodiphenylsulfone
NMP=N-methylpyrrolidone
PAA=poly(amic acid)
DMAC=N,N-dimethylacetamide
ITO=indium/tin oxide
ZLI-2293=a liquid crystal mixture of cyanophenylcyclohexanes and biphenylcyclohexanes having a clearing point of 85° C., a dielectric anisotropy of 10 (1 KHz, 20° C.), an optical anisotropy of 0.1322 (20° C., 589 nm) and an extraordinary index of refraction of 1.6312 (20° C., 589 nm) (sold by Merck KGaA, Darmstadt, Germany).
ZLI-2903=a liquid crystal mixture of cyanophenylcyolohexanes, biphenylcyclohexanes and cyclohexylbiphenylcyclohexanes having a clearing point of 110° C., a dielectric anisotropy of 6.0 (1 kHz, 20° C.), an optical anisotropy of 0.1325 and an extraordinary refractive index of 1.6327 (20° C., 589 nm) (sold by Merck KGaA, Darmstadt, Germany)
ZLI-4792=a liquid crystal mixture of SFM's containing mainly phenylcyclohexanes, biphenylcyclohexanes and cyclohexylbiphenylcyclohexanes having a clearing point of 92° C., a dielectric anisotropy of 5.2 (1 kHz, 20° C.), an optical anisotropy of 0.0969 and an extraordinary refractive index of 1.5763 (20° C., 589 nm) (sold by Merck KGaA, Darmstadt, Germany)
MLC-6025-000=a liquid crystal mixture containing orthofluorinated-cyanophenylesters as dielectrically positive compounds having a clearing point of 103° C., a dielectric anisotropy of 3.3 (1 kHz, 20° C.) an optical anisotropy of 0.0840 and an extraordinary refractive index of 1.5670 (20° C., 589 nm) (sold by Merck KGaA, Darmstadt, Germany)

EXAMPLE 1

Into a 100 ml reaction kettle equipped with a mechanical stirrer and nitrogen inlet and outlet were charged 4.58169

(0.0156722 mole) of APB-134 along with 38 ml of NMP. After dissolution of the diamine, 3.3501 g, (0.015359 mole) of PMDA and 0.0928 g (0.0006265 mole) of PA were added as solids and rinsed in with 4 ml of NMP (42 ml NMP total). The reaction mixture was stirred overnight at room temperature under nitrogen. A viscous, amber poly(amic acid) solution resulted, a portion of which was subsequently diluted to 3.5% solids with NMP (viscosity 28 cps). The diluted PAA solution was spin coated onto 7-inch×7-inch ITO coated glass plates. The PAA coated glass plates (film thickness 660 angstroms at 3000 RPM spin speed) were then placed on a hot plate at 100° C. for 1 minute, followed by curing in an air oven at 180° to 270° C. for 1.5 hours. The cured film was then buffed twice unidirectionally with a rayon cloth (YOSHIKAWA YA20R) on a rubbing machine (KETEK, Inc.) under the following conditions: radius of rubbing wheel=50 mm, rotation speed=190 rpm, translation speed of glass plate=25 mm/sec, pile impression=0.3 mm. For tilt angle measurements, the coated glass plates were assembled so that their respective rubbing directions were anti-parallel to each other. The spacing between the glass plates was set at 50 μm by incorporation of glass fibers into the UV curable adhesive placed around the perimeter of the plates, followed by curing of the adhesive. The frame sealant used was Norland NEA 123 from Lubrical, Bad Konig, Germany. The sealant was cured for 2 minutes using a 400 watt UV lamp (UVA-spot 400/K) at an exposure distance of 15 inches at a temperature of 20° C. Two small gaps in the adhesive were left to allow filling of the cell. The liquid crystal mixture was filled into the gap between the plates via capillary action. The completed cell was placed in an oven at 120° C. for 20 minutes to allow for complete isotropization of the LC mixture. The test cells were then cooled and stored at room temperature for 12 hours prior to measurement of the tilt angle.

Tilt angle measurements were performed using the crystal rotation method as described by G. Baur et al., *Physics Letters*, Vol. 56A, No. 2, pp. 142–144, 1976.

Tilt angles were measured using a commercially available set up TBA 101 from Autronic Melchers, Karlsruhe, Germany, and a customized set up of Merck KGaA, Darmstadt, Germany, of 50 μm thick planar cells with antiparallel rubbing. The measurement was performed at a temperature of 20° C., after annealing of the cells, i.e. heating the LC to the isotropic state. The interference signal of a He-Ne laser beam (633 nm) was monitored as a function of the angle of incidence of the rotating anisotropic liquid crystal cell. The tilt angles were determined from the symmetry angle of the interference pattern taking into account the refractive indices of the liquid crystal at 633 nm. All experimental results reported are average values of at least two independent measurements of at least two separate test cells. All values refer to a temperature of 20° C. unless stated otherwise.

The liquid crystal test cell containing the polyimide as alignment layer and ZLI-2293 (Merck KGaA, Darmstadt, Germany) as liquid crystal mixture exhibited an initial tilt angle of 1.7° when cured at 270° C. Post heat treatment of the test cells at 180° C. for 2 hours resulted in a stable, low tilt angle of 1.4°. The tilt angle after heat treatment was stable after storage at 80° C. for at least 250 hours. Results are summarized in Table I.

EXAMPLES 2 TO 10 (COMPARATIVE EXAMPLES C1 TO C19)

In a similar manner to Example 1, several other poly(amic acid)s were prepared based on various dianhydrides and diamines. In some cases, another suitable solvent, DMAC was used to prepare the poly(amic acid)s (Examples 4, C12). Phthalic anhydride (PA) was used as an endcapper to control molecular weight, in most cases, although its use is not required according to the present invention. PA was added either at the beginning of the reaction along with the dianhydride(s) or preferably later after the polymerization reaction was complete to cap residual amine ends. The latter process can be used to adjust the molecular weight during the reaction by adding small increments of dianhydride before capping the excess amine groups with PA. Table I lists the composition of these polymers and the tilt angle results. The tilt angles after heat treatment were stable after storage at 60° C. for at least 1000 hours.

The comparative examples show that polyimide alignment films containing a major amount of a tetracarboxylic dianhydride other than pyromellitic dianhydride (PMDA) when used in combination with APB-134 (C5, C6, C7, C9, C12, C13, C14, C19) provided tilt angles which were too high and/or had poor stability, the tilt angles dramatically decreasing in value after heat treatment at 180° C. for 2 hours. Polyimide alignment films which contained APB-133 as the major aromatic diamine component in place of APB-134, e.g. Example 2 of Japanese patent application 2-309323, exhibited an initial tilt angle which had poor stability and generally provided poor liquid crystal alignment (C2, C3, C4, C8). Comparative Example C1, which used APB133 in combination with PPD as the major diamine gave a stable tilt angle which was too high. Comparative Example C10 shows that conventional polyimides such as PMDA/ODA gave good and stable alignment but the tilt angles exceeded the desired 2 degree or lower range necessary for good contrast and low "off state transmission" in normally black TN liquid crystal displays. Comparative Example C11 shows that the meta-orientation of the amine group to the ether connecting bridge generally gave poor alignment and tilt angle stability (compare to Example 8 of the present invention).

TABLE I

| Example No. | Monomers (mole %) | Cure Temp. (°C.) | Tilt Angle (Initial) (Degrees) | Tilt Angle (after 180° C., 2 hr. heat treatment) (Degrees) |
|---|---|---|---|---|
| 1 | PMDA/APB-134 (100/100) | 270 | 1.7 | 1.4 |
| 2 | PMDA/APB-134/ PPD/PA (98/50/50/4) | 180 250 | 2.2 1.6 | 2.0 1.5 |
| 3 | PMDA/APB-134/ ODA/PA (98/80/20/4) | 180 250 | 2.4 1.7 | 1.9 1.5 |
| 4 | PMDA/APB-144/PA | 180 250 | 2.3 2.0 | 1.6 1.7 |
| 5 | PMDA/APB-134/MPD (99.5/50/50) | 180 250 | 2.1 1.8 | 1.8 1.4 |
| 6 | PMDA/APB-134/ ODA/PA (98.5/50/50/3) | 180 250 | 2.4 1.8 | 2.0 1.4 |
| 7 | PMDA/BAPB/PA (98/100/4) | 180 250 | 2.0 1.8 | 1.8 1.6 |
| 8 | PMDA/BAPS/PA (98/100/4) | 180 250 | 2.0 2.3 | 1.3 1.7 |
| 9 | PMDA/BTDA/ APB-134/PA (78/20/100/4) | 180 250 | 2.3 2.4 | 1.9 2.0 |
| 10 | PMDA/ODPA/ APB-134/PA (78.4/19.6/100/4) | 250 | 2.0 | 1.5 |

TABLE I-continued

| Example No. | Monomers (mole %) | Cure Temp. (°C.) | Tilt Angle (Initial) (Degrees) | Tilt Angle (after 180° C., 2 hr. heat treatment) (Degrees) |
|---|---|---|---|---|
| C1 | PMDA/PPD/APB-133 (100/60/40) (Ex. 1 of Japanese 2-309322) | 180 250 | 3.2 2.3 | 2.5 2.3 |
| C2 | PMDA/APB-133/ 3,3'-DADS (100/50/50) (Ex. 1 of Japanese 2-309323) | 280 250 | 1.2 poor alignment around edge 3.0 | 0.6 poor alignment 2.2 |
| C3 | PMDA/APB-133 (99.8/100) | 180 | 2.5 | 0.1 poor alignment |
| C4 | PMDA/APB-133/MPD (99.8/80/20) | 180 250 | 1.4 1.3 | 0.3 0.4 |
| C5 | ODPA/APB-134 (100/100) | 270 | 2.4 | 0.4 |
| C6 | ODPA/APB-134 (100/100) | 270 | 1.5, 1.5 | 0.4/0.3 |
| C7 | ODPA/APB-134 (100/100) | 250 | 1.1 | — |
| C8 | ODPA/APB-133 (100/100) | 250 | 0.2 poor alignment | — |
| C9 | 6FDA/APB-134 (100/100) | 250 | 0.2 poor alignment | — |
| C10 | PMDA/ODA (100/100) | 250 | 2.4 | 2.3 |
| C11 | PMDA/m-BAPS/PA (99.5/100/1) | 180 250 | 0.8 1.3 | 0.3 poor alignment 0.7 |
| C12 | ODPA/PMDA/ APB-134 (80/20/100) | 270 | 2.4, 2.3 | 1.2, 1.5 |
| C13 | BTDA/APB-134/PA (99/100/2) | 180 250 | 3.8 3.8 | 1.0 2.5 |
| C14 | BPDA/APB-134/PA (99/100/2) | 180 250 | 2.3 1.4 | 0.5 1.1 |
| C15 | PMDA/BAPP (100/100) | 180 250 | 2.9 3.5 | 2.3 2.3 |
| C16 | PMDA/Bisaniline M (100/100) | 180 250 | 0.2 poor alignment 0.3 poor alignment | 0.2 poor alignment 0.2 poor alignment |
| C17 | PMDA/Bisaniline P (100/100) | 180 250 | 5.2 no alignment | 4.4 no alignment |
| C18 | CBDA/APB-134 (100/100) | 180 250 | 3.4 2.8 | 3.1 2.3 |
| C19 | PMDA/6FDA/ APB-134/PA (50/49.5/100/1) | 180 250 | 4.5 4.3 | 2.3 2.7 |

EXAMPLES 11 TO 14

Test cells containing the polyimide alignment layer of Example 1, prepared using a cure temperature of 250° C., were filled with different liquid crystal mixtures. The liquid crystal mixture used in Example 11 was ZLI-2293, and the liquid crystal mixtures used in Examples 12,13, and 14 were, respectively, ZLI-2903, ZLI-4792 and MLC-6025-000, all obtained from Merck KGaA, Darmstadt, Germany. These mixtures represent three completely different types of liquid crystal formulations. ZLI-2903 is of similar composition to ZLI-2293, both consisting essentially of phenylcyclohexanes, biphenylcyclohexanes and cyclohexylbiphenylcyclohexanes. In contrast, ZLI-4792 contains a mixture of SFM's as the only dielectrically positive compounds and MLC-6025-000 contains ortho-fluorinated cyanophenylesters as the only dielectrically positive compounds. The tilt angles after heat treatment at 100° C. for 2 hours were stable after storage at 70° C. for at least 250 hours. The tilt angle results for Examples 11 to 14 are given in Table II.

TABLE II

| Example No. | LC Mixture No. | Cure Temp. (°C.) | Tilt Angle (Initial) (Degrees) | Tilt Angle (after 180° C., 2 hr. heat treatment) (Degrees) |
|---|---|---|---|---|
| 11 | ZLI-2293 | 250 | 1.6 | 1.4 |
| 12 | ZLI-2903 | 250 | 1.7 | 1.5 |
| 13 | ZLI-4792 | 250 | 1.5 | 1.4 |
| 14 | MLC-6025-000 | 250 | 1.6 | 1.4 |

What is claimed is:

1. A polyimide alignment film for aligning a liquid crystal layer of a liquid crystal display device consisting essentially of at least 60 mole % of pyromellitic dianhydride as aromatic tetracarboxylic dianhydride based on the total aromatic tetracarboxylic dianhydride present, and at least 50 mole % of an aromatic diamine component based on the total aromatic diamine present, the aromatic diamine of the formula

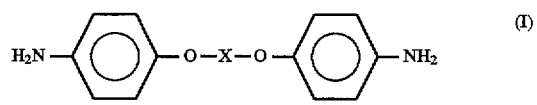

wherein X is selected from the group consisting of

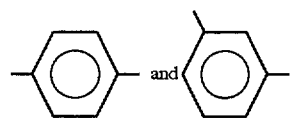

and wherein said polyimide alignment film provides said liquid crystal layer with a tilt angle of from 1 to 2 degrees.

2. The polyimide alignment film of claim 1 wherein the aromatic tetracarboxylic dianhydride component contains, in addition to the pyromellitic dianhydride, up to 40 mole % of an additional tetracarboxylic dianhydride.

3. The polyimide alignment film of claim 2 wherein the additional tetracarboxylic dianhydride comprises 3,3',4,4'-biphenyltetracarboxylic dianhydride, 3,3',4,4'-benzophenonetetracarboxylic dianhydride, oxydiphthalic dianhydride, 2,2-bis(3,4-dicarboxyphenyl)-hexafluoropropane dianhydride, 9,9-bis(trifluoromethyl)-2,3,6,7-xanthanetetracarboxylic dianhydride or 9-phenyl-9-trifluoromethyl-2,3,6,7-xanthenetetracarboxylic dianhydride, cyclobutanetetracarboxylic dianhydride or 2,3,5-tricarboxycyclopentyl acetic acid dianhydride.

4. The polyimide alignment film of claim 1 wherein the aromatic diamine component contains up to 50 mole % of an additional aromatic diamine.

5. The polyimide alignment film of claim 1 wherein x is

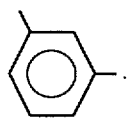

6. The polyimide alignment film of claim 1 wherein x is

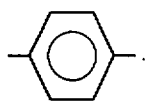

7. A polyimide alignment film for aligning a liquid crystal layer of a liquid crystal display device consisting essentially of pyromellitic dianhydride as aromatic tetracarboxylic dianhydride and an aromatic diamine component of the formula

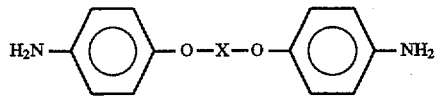

wherein X is selected from the group consisting of

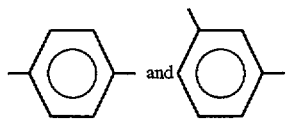

wherein the aromatic diamine component contains up to 50 mole % of an additional aromatic diamine comprising 4,4'-diaminodiphenyl ether, m-phenylene diamine, p-phenylene dime, 2,2-bis(4-aminophenyl)hexafluoropropane, 2,2'-bis(trifluoromethoxy)benzidine, 2 2' -bis(trifluoromethyl) benzidine or 2,2-bis[4-(3-aminophenoxy)phenyl]hexafluoropropane, and wherein said polyimide alignment film provides said liquid crystal layer with a tilt angle of from 1 to 2 degrees.

8. A polyimide alignment film for aligning a liquid crystal layer of a liquid crystal display device consisting essentially of pyromellitic dianhydride as aromatic tetracarboxylic dianhydride and 1,3-bis(4-aminophenoxy) benzene as an aromatic diamine component, and wherein said polyimide alignment film provides said liquid crystal layer with a tilt angle of from 1.4 to 1.7 degrees.

9. A polyimide alignment film for aligning a liquid crystal layer of a liquid crystal display device consisting essentially of pyromellitic dianhydride as aromatic tetracarboxylic dianhydride and 1,4-bis(4-aminophenyoxy) benzene as an aromatic diamine component, and wherein said polyimide alignment film provides said liquid crystal layer with a tilt angle of from 1.6 to 1.7 degrees.

10. A polyimide alignment film for aligning a liquid crystal layer of a liquid crystal display device consisting essentially of pyromellitic dianhydride as aromatic tetracarboxylic dianhydride, from 50 to 80 mole % of 1,3-bis(4-aminophenoxy)benzene as an aromatic diamine component, and from 20 to 50 mole % of an additional dime component comprising 4,4'-diaminodiphenyl ether, p-phenylene diamine or m-phenylene diamine and wherein said polyimide alignment film provides said liquid crystal layer with a tilt angle of from 1.4 to 2.0 degrees.

* * * * *